(12) United States Patent
Mowris et al.

(10) Patent No.: US 11,879,651 B2
(45) Date of Patent: *Jan. 23, 2024

(54) OCCUPANCY-BASED FAN CONTROL

(71) Applicants: Robert J. Mowris, Olympic Valley, CA (US); James Lau, Tustin, CA (US)

(72) Inventors: Robert J. Mowris, Olympic Valley, CA (US); John Walsh, Bozeman, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/958,069

(22) Filed: Sep. 30, 2022

(65) Prior Publication Data
US 2023/0059157 A1   Feb. 23, 2023

Related U.S. Application Data

(63) Continuation-in-part of application No. 17/526,725, filed on Nov. 15, 2021, now Pat. No. 11,460,208, (Continued)

(51) Int. Cl.
*F24F 1/00* (2019.01)
*F24F 11/46* (2018.01)
(Continued)

(52) U.S. Cl.
CPC .............. *F24F 11/46* (2018.01); *F24F 11/52* (2018.01); *F24F 11/77* (2018.01); *F24F 2120/10* (2018.01)

(58) Field of Classification Search
None
See application file for complete search history.

(56) References Cited

U.S. PATENT DOCUMENTS 2,655,645 A   10/1953   Bagno
4,404,815 A   9/1983   Gibson
(Continued)

OTHER PUBLICATIONS

American National Standards Institute (ANSI) / American Society of Heating, Refrigerating, and Air-Conditioning Engineers, Inc. (ASHRAE) / Illuminating Engineering Society (IES), ANSI/ASHRAE/IES. Standard 90.1-2019 Energy Standard for Buildings Except Low-Rise Residential Buildings. Date: 2019. pp. Published by ASHRAE Inc., 1791 Tullie Cir NE, Atlanta, GA 30329 USA.
(Continued)

*Primary Examiner* — Paul B Yanchus, III
(74) *Attorney, Agent, or Firm* — CIONCA IP Law P.C.; Marin Cionca (57) ABSTRACT

A Heating, Ventilating Air Conditioning (HVAC) fan control method to detect an HVAC fan is controlled by at least one fan-on duration control selected by a user and provide at least one fan-on alarm message prior to overriding the at least one fan-on duration control. The method monitors an occupancy sensor signal to determine an occupancy in a conditioned space served by an HVAC system and automatically overrides the at least one fan-on duration control to save energy when the conditioned space is unoccupied. The overriding may comprise operating the HVAC fan based only on a thermostat call for cooling or a thermostat call for heating, operating the HVAC fan for less time than the at least one fan-on duration control selected by the user, and operating the HVAC fan for less frequency than the at least one fan-on duration control selected by the user.

14 Claims, 2 Drawing Sheets

Related U.S. Application Data which is a continuation-in-part of application No. 16/909,752, filed on Jun. 23, 2020, now Pat. No. 11,175,060, which is a continuation-in-part of application No. 16/897,634, filed on Jun. 10, 2020, now Pat. No. 11,029,057, which is a continuation-in-part of application No. 16/882,222, filed on May 22, 2020, now Pat. No. 11,029,061, which is a continuation-in-part of application No. 16/869,396, filed on May 7, 2020, now Pat. No. 11,022,335, which is a continuation-in-part of application No. 16/565,464, filed on Sep. 9, 2019, now Pat. No. 11,187,425, which is a continuation-in-part of application No. 16/289,313, filed on Feb. 28, 2019, now Pat. No. 10,712,036, said application No. 16/869,396 is a continuation-in-part of application No. 16/011,120, filed on Jun. 18, 2018, now Pat. No. 10,663,186, said application No. 16/289,313 is a continuation-in-part of application No. 15/614,600, filed on Jun. 5, 2017, now Pat. No. 10,281,938, which is a continuation-in-part of application No. 15/358,131, filed on Nov. 22, 2016, now Pat. No. 9,671,125, said application No. 16/011,120 is a continuation-in-part of application No. 15/169,586, filed on May 31, 2016, now Pat. No. 10,001,289.

(60) Provisional application No. 62/728,518, filed on Sep. 7, 2018.

(51) Int. Cl.
    *F24F 11/52*     (2018.01)
    *F24F 11/77*     (2018.01)
    *F24F 120/10*     (2018.01)

(56) References Cited

U.S. PATENT DOCUMENTS

| | | |
|---|---|---|
| 5,447,037 A | 9/1995 | Bishop |
| 5,544,809 A | 8/1996 | Keating |
| 5,996,898 A | 12/1999 | Parker |
| 6,223,544 B1 | 5/2001 | Seem |
| 6,415,617 B1 | 7/2002 | Seem |
| 6,684,944 B1 | 2/2004 | Byrnes |
| 6,695,046 B1 | 2/2004 | Byrnes |
| 6,805,733 B2 | 10/2004 | Engel |
| 7,444,251 B2 | 10/2008 | Nikovski |
| 7,469,550 B2 | 12/2008 | Chapman, Jr. |
| 7,500,368 B2 | 3/2009 | Mowris |
| 8,066,558 B2 | 11/2011 | Thomle |
| 8,747,753 B2 | 6/2014 | Engel |
| 8,965,585 B2 | 2/2015 | Lombard |
| 8,972,064 B2 | 3/2015 | Grabinger |
| 9,195,335 B2 | 11/2015 | Sirpal et al. |
| 9,435,557 B2 | 9/2016 | Albrecht |
| 9,500,382 B2 | 11/2016 | Grabinger |
| 9,703,274 B2 | 7/2017 | Li |
| 9,765,986 B2 | 9/2017 | Thomle |
| 9,784,468 B2 | 10/2017 | Bisson |
| 9,874,364 B2 | 1/2018 | Bujak, Jr. |
| 10,060,642 B2 | 8/2018 | Sikora |
| 11,175,060 B2 * | 11/2021 | Mowris ............... F24F 11/46 |
| 2002/0090908 A1 | 7/2002 | Estepp |
| 2003/0021720 A1 | 1/2003 | Reisfeld |
| 2005/0005616 A1 | 1/2005 | Bates |
| 2006/0219382 A1 | 10/2006 | Johnson |
| 2008/0277486 A1 | 11/2008 | Seem |
| 2009/0032236 A1 | 2/2009 | Geadelmann |
| 2009/0126382 A1 | 5/2009 | Rubino |
| 2011/0160914 A1 | 6/2011 | Kennet |
| 2011/0190910 A1 | 8/2011 | Lombard |
| 2014/0195106 A1 | 7/2014 | McQuade |
| 2015/0204571 A1 | 7/2015 | Messmer |
| 2015/0309120 A1 | 10/2015 | Bujak, Jr. |
| 2016/0116177 A1 | 4/2016 | Sikora |
| 2017/0299212 A1 | 10/2017 | Svitak |
| 2018/0320916 A1 | 11/2018 | Vincitore |
| 2020/0326088 A1 * | 10/2020 | Mowris ............... G05B 19/042 |

OTHER PUBLICATIONS

Honeywell Inc. JADE Economizer Module (Model W7220). Date: 2018. pp. 32. Published by Honeywell, Golden Valley, MN 55422, USA.

Belimo. Belimo ZIP Economizer Installation and Operation Manual. Date: Jan. 30, 2020. pp. 54. Belimo Americas, 33 Turner Rd., Danbury, CT 06810, USA.

Pelican Wireless Systems, Installation Guide Pearl Economizer Controller (WM500 Manual), Date: Feb. 10, 2016, pp. 36, Pelican Wireless Systems, 2655 Collier Canyon Rd., Livermore, CA 94551. USA. https://www.pelicanwireless.com/wp-content/uploads/2016/04/InstallGuide_PEARL.pdf.

Venstar Inc., Venstar Commercial Thermostat T2900 Manual, Date: Dec. 21, 2010. pp. 113. Venstar Inc., 9250 Owensmouth Ave., Chatsworth, California 91311. USA. https://files.venstar.com/thermostats/slimline/documents/T2900ManualRev5.pdf.

Ecobee Inc. Energy Management System Manual. Date: Apr. 11, 2013, pp. 36. Ecobee Inc., 25 Dockside Dr Suite 700, Toronto, ON M5A 0B5, Canada https://support.ecobee.com/hc/en-us/articles/360012061792-EMS-Guides-and-Manuals.

Carrier Corporation Inc. Totaline Gold Commercial Thermostat Installation and Operating Instructions. Date: Nov. 1999. pp. 12. United Technologies Corporation, One Carrier Place, Farmington, CT 06034-4015 USA https://dms.hvacpartners.com/docs/1005/Public/08/P274-2Sl.pdf.

Honeywell Inc. TB8220 Commercial VisionPRO Programmable Thermostat. Date: Mar. 15, 2005. pp. 24. Honeywell International Inc., 1985 Douglas Drive North, Golden Valley, MN 55422 USA. https://customer.honeywell.com/resources/techlit/TechLitDocuments/63-0000s/63-2625.pdf.

California Energy Commission (CEC). 2008 Residential Appendices for the Building Energy Efficiency Standards for Residential and Nonresidential Buildings. CEC-400-2008-004-CMF. Date: Dec. 2008. pp. 363. Published by the CEC, 1516 9th St, Sacramento, CA 95814 USA.

California Energy Commission (CEC). 2012 Reference Appendices: the Building Energy Efficiency Standards for Residential and Nonresidential Buildings. CEC-400-2012-005-CMF-REV3. Date: May 2012. pp. 10. 146/001 476, Published by the California Energy Commission, 1516 9th St, Sacramento, CA 95814 USA (CEC 2012).

California Energy Commission (CEC). 2019 Building Energy Efficiency Standards for Residential and Nonresidential Buildings. CEC-400-2018-006-20-CMF. Date: Dec. 2018. pp. 325. Published by the California Energy Commission, 1516 9th St., Sacramento, CA 95814 USA.

Yuill, D., P., Braun, J. Evaluating Fault Detection and Diagnostics Protocols Applied to Air-Cooled Vapor Compression Air-Conditioners. Date: Jul. 16, 2012. pp. 11. International Refrigeration and Air Conditioning Conference. Paper 1307. Published by Ray W. Herrick Laboratories, Purdue University, 177 S Russell St,, West Lafayette, IN 47907 USA (Yuill 2012). http://docs.lib.purdue.edu/iracc/1307.

Mowris, R., E. Jones, R. Eshom, K. Carlson, J. Hill, P. Jacobs, J. Stoops. Laboratory Test Results of Commercial Packaged HVAC Maintenance Faults. Date: Feb. 2016. pp. 250. Prepared by Robert Mowris & Associates, Inc. (RMA) and published by California California Public Utilities Commission. http://www.calmac.org/publications/RMA_Laboratory_Test_Report_2012-15_v3.pdf.

Hart R., D. Morehouse, W. Price. 2006. The Premium Economizer: An Idea Whose Time Has Come. Date: Aug. 2006. pp. 13. Prepared by the Eugene Water & Electric Board and published by the American Council for an Energy Efficient Economy (ACEEE). Washington, DC (Hart 2006). See https://www.semanticscholar.org/

(56) References Cited

OTHER PUBLICATIONS paper/The-Premium-Economizer%3A-An-Idea-Whose-Time-Has-Come-Hart/3b8311bdf8cb40210ccabd0cec8906bda00d0fec.

Taylor, S., C. Cheng. Economizer High Limit Controls and Why Enthalpy Economizers Don't Work. 2010 (Taylor 2010). Date: Nov. 2010. pp. 11. ASHRAE Journal. 52. 12-28. Published by the American Society of Heating, Refrigerating and Air-Conditioning Engineers, Inc. (ASHRAE). See https://www.scribd.com/document/390134082/ASHRAE-Why-Enthalpy-Economizers-Don-t-Work-Taylor-Cheng.

California Energy Commission (CEC). 2016. Reference Appendices the Building Energy Efficiency Standards for Residential and Nonresidential Buildings. Date: Jun. 2015. pp. 503. CEC-400-2015-038-CMF, Published by the California Energy Commission, 1516 9th St, Sacramento, CA 95814. USA. https://ww2.energy.ca.gov/2015publications/CEC400-2015-038/CEC-400-2015-038-CMF.pdf.

Lutron. Residential Sensor Specification Guide. Date: Feb. 8, 2013. pp. 26. Lutron Electronics Company Inc., 7200 Suter Rd Coopersburg, PA 18036-1299 USA. USA https://www.lutron.com/TechnicalDocumentLibrary/3672236_Sensor_Spec_Guide.pdf.

Ecobee Inc. How to control your HVAC system's fan with your ecobee thermostat. Date: Jan. 13, 2020. p. 7. Published by Ecobee Inc., 25 Dockside Dr., Suite 700, Toronto, ON M5A 0B5, Canada. https://support.ecobee.com/hc/en-us/articles/360004798951-How-to-control-your-HVAC-system-s-fan-with-your-ecobee-thermostat.

Google Inc. How to Control Your Fan with a Nest Thermostat. Date: Dec. 30, 2019. pp. 4. Published by Google, Inc. 1600 Amphitheatre Parkway, Mountain View, CA 94043 USA. https://support.google.com/googlenest/answer/9296419?hl=en.

Carrier Corporation. HVAC Servicing Procedures. SK29-01A, 020-040. Date: 1997. pp. 8 (Cover, preface, and pp. 145-150). Published by Carrier Corporation, 13995 Pasteur Blvd., Palm Beach Gardens, Florida 33418 USA.

United States Energy Information Administration (US EIA). Use of energy explained Energy use in homes. May 2019. pp. 5. US EIA. Washington DC. USA. https://www.eia.gov/energyexplained/use-of-energy/homes.php.

United States Energy Information Administration (US EIA). 2012 Commercial Buildings Energy Consumption Survey: Energy Usage Summary. Date: May 2021. pp. 6. US EIA. Washington DC. USA. https://www.eia.gov/consumption/commercial/reports/2012/energyusage/index.php.

DNVGL Impact Evaluation of 2013-14 HVAC3 Commercial Quality Maintenance Programs. Date: Apr. 2016. pp. 267. California Public Utilities Commission (CPUC). San Francisco, CA. USA http://www.calmac.org/publications/HVAC3ImpactReport_0401.pdf.

Scott Pigg. Electricity Use by New Furnaces: A Wisconsin Field Study. Technical Report 230-1. Date: Oct. 2003. pp. 71. Wisconsin Department of Administration (DOA) Division of Energy. Madison, Wisconsin. USA. https://www.proctoreng.com/dnld/WIDOE2013.pdf.

Tom Talerico. ECM Furnace Impact Assessment Report. Date: Jun. 28, 2004. pp. 192. Wisconsin DOA Division of Energy. Madison, Wisconsin. USA. library.cee1.org/system/files/library/1814/997.pdf.

Tom Talerico. ECM Furnace Impact Assessment Report. Date: Jan. 2009. pp. 78. Wisc. DOA Division of Energy. Madison, WI. USA. https://focusonenergy.com/sites/default/files/emcfurnaceimpactassessment_evaluationreport.pdf.

Scott Pigg and Tom Talerico. Electricity Savings from Variable-Speed Furnaces in Cold Climates. Date: Aug. 2004. pp. 16. American Council for an Energy Efficient Economy (ACEEE) Summer Study on Energy Efficiency in Buildings, Asilomar, CA, Published by ACEEE. Washington DC. USA. https://www.aceee.org/files/proceedings/2004/data/papers/SS04_Panel1_Paper23.pdf.

American Society of Heating, Refrigerating, and Air-Conditioning Engineers (ASHRAE). Standard 62.1 ANSI/ASHRAE 62.1-2022. Standard Ventilation for Acceptable Indoor Air Quality. Date: 2022. pp. 86. ASHRAE. Atlanta, GA. USA. https://www.ashrae.org/technical-resources/bookstore/standards-62-1-62-2.

Honeywell. How Does the Fan Auto/On Switch or Key Work? Date: Jan. 31, 2022. pp. 1, Honeywell Inc., Golden Valley, MN 55422. https://www.honeywellhome.com/us/en/support/7-day-programmable-thermostats-3/.

M. Vega-Barbas et al., AFOROS: A Low-Cost Wi-Fi-Based Monitoring System for Estimating Occupancy of Public Spaces. Date: Jun. 2021, pp. 20, Multidisciplinary Digital Publishing Institute (MDPI). Basel, Switzerland. https://www.mdpi.com/1424-8220/21/11/3863.

Leviton. Multi-Technology Ceiling Occupancy Sensor with Isolated Relay. Date: Aug. 2018. pp. 4. Leviton Manufacturing Co., Inc. Global Headquarters, 201 North Service Road, Melville, NY 11747-3138. https://www.leviton.com/en/docs/Multi-Technology_Occupancy_Sensor_with_Isolated_Relay_OSCxx-M_HVAC_Data_Sheet_Occupancy_Sensors.pdf.

Lutron Electronics Inc., Dual Technology Ceiling Mount Sensor. Date: Feb. 7, 2013. pp. 9. Lutron Electronics Inc., 7200 Suter Rd Coopersburg, PA 18036-1299. https://assets.lutron.com/a/documents/369653.pdf.

* cited by examiner

OCCUPANCY-BASED FAN CONTROL

CROSS-REFERENCE TO RELATED APPLICATIONS

The present application is a Continuation In Part (CIP) of application Ser. No. 17/526,725 filed Nov. 15, 2021, which is a CIP of application Ser. No. 16/909,752 filed Jun. 23, 2020, which is a CIP of application Ser. No. 16/897,634 filed Jun. 10, 2020, which is a CIP of application Ser. No. 16/882,222 filed May 22, 2020, which is a CIP of application Ser. No. 16/869,396 filed May 7, 2020, which is a CIP of application Ser. No. 16/565,464 filed Sep. 9, 2019, which is a CIP of application Ser. No. 16/289,313 filed Feb. 28, 2019, which is a CIP of application Ser. No. 15/614,600 filed Jun. 5, 2017, which is a CIP of application Ser. No. 15/358,131 filed Nov. 22, 2016, and the said application Ser. No. 16/565,464 filed Sep. 9, 2019 which claims the priority of U.S. provisional application Ser. No. 62/728,518 filed Sep. 7, 2018, and said application Ser. No. 16/869,396 filed May 7, 2020, is a CIP of application Ser. No. 16/011,120 filed Jun. 18, 2018, which is a CIP of application Ser. No. 15/169,586 filed May 31, 2016, the present application claiming the priority of the above applications which are incorporated in their entirety herein by reference.

BACKGROUND OF THE INVENTION

The present invention relates to a Heating, Ventilating, and Air Conditioning (HVAC) systems.

Known HVAC systems are controlled by thermostats or Energy Management Systems (EMS). Research studies show that 9 to 46% of residential occupants select continuous or hourly HVAC fan-on controls which increases fan electricity use by 125 to 3520 kWh/yr representing 2.7% to 34% of total residential electricity use (based on information and studies cited below).

The HVAC fan-on energy use for commercial buildings is significantly higher than residential buildings due to operating the HVAC fans continuously to meet minimum outdoor airflow requirements per the American Society of Heating Refrigeration and Air-Conditioning Engineers (ASHRAE) Standard 62.1 (ANSI/ASHRAE 62.1-2022. Standard Ventilation for Acceptable Indoor Air Quality). When commercial buildings are unoccupied at night or on weekends or holidays, about 50 to 80% of buildings continue to operate the HVAC fans continuously to meet minimum outdoor airflow requirements which wastes fan energy and cooling or heating energy to condition the outdoor air. Due this problem commercial building ventilation fan energy uses 22.7% of total annual US HVAC energy compared to 20.5% for cooling and 56.8% for heating. See US Energy Information Administration (EIA) 2019. Commercial Buildings Energy Consumption Survey (CBECS). Washington, DC: EIA. https://www.eia.gov/consumption/.

Non patent publication UNITED STATES ENERGY INFORMATION ADMINISTRATION (US EIA). Use of energy explained Energy use in homes. May 2019. Pages: 5. US EIA. Washington DC USA. https://www.eia.gov/energyexplained/use-of-energy/homes.php. Page 1 indicates miscellaneous end uses accounted for 21% of total residential end-use consumption for all U.S. homes in 2015. Page 3 indicates the U.S. residential sector energy consumption was 11.63 quadrillion British thermal units (quads) in 2020. The range of total electricity use is 4581 kWh/yr for apartments (5+) in the West, 12,815 for mobile homes in the Midwest, to 15,819 kWh/yr for single family homes in the South. For all homes the US EIA average range is 8211 kWh/yr in the Northeast to 13895 kWh/yr in the South. Assuming HVAC fan-on energy use accounts for 13% of total miscellaneous electricity use or 2.7% of the total provides a range of 125 to 432 kWh/yr. For circulate fan-on settings (20 minutes/hr) the HVAC fan-on energy will be 583 to 1459 kWh/yr, and for continuous settings the HVAC fan-on energy will be 1054 to 3520 kWh/yr.

Non patent publication by UNITED STATES ENERGY INFORMATION ADMINISTRATION (US EIA). 2012 Commercial Buildings Energy Consumption Survey: Energy Usage Summary. May 2021. Pages: 6. US EIA. Washington DC USA. https://www.eia.gov/consumption/commercial/reports/2012/energyusage/index.php. FIG. 5 shows heating 25%, ventilation 10% and cooling 9% of the total. Within commercial HVAC ventilation is 22.7%, cooling is 20.5%, and heating is 56.8%.

Non patent publication by DNVGL Impact Evaluation of 2013-14 HVAC3 Commercial Quality Maintenance Programs. April 2016. Pages: 267. California Public Utilities Commission (CPUC). San Francisco, CA USA http://www.calmac.org/publications/HVAC3ImpactReport_0401.pdf. DNVGL page 68 reports 78% of commercial buildings in Southern California Edison (SCE) had HVAC "fans running continuously in the as-found case" (per FIG. 17 on p. 68). Page 69 reports 97.2% of participants sites had the HVAC fan running continuously per "FIG. 18. SCE Commercial QM implementer supply fan treatment when found on."

Non patent publication by SCOTT PIGG. Electricity Use by New Furnaces: A Wisconsin Field Study. Technical Report 230-1. October 2003. Pages: 71. Wisconsin Department of Administration (DOA) Division of Energy. Madison, Wisconsin USA. https://www.proctoreng.com/dnld/WIDOE2013.pdf. This study monitored 31 homes where 16% operated the HVAC fan continuously and 19% operated the HVAC fan sporadically (referred to hereafter as "hourly").

Non patent publication by TOM TALERICO. ECM Furnace Impact Assessment Report. Jun. 28, 2004. Pages: 192. Wisconsin DOA Division of Energy. Madison, Wisconsin USA. library.cee1.org/system/files/library/1814/997.pdf. The study monitored 150 participant homes and 36 nonparticipant homes where 28% to 46% of participants and 8.4% to 22.2% of non-participants operated the HVAC fan continuously or hourly. Page C-2 cites reasons given by occupants for HVAC fan-on controls. "Contractor said this was the most efficient way to operate it. Contractor said to operate it all the time throughout the year because it was better and would not use more energy. Contractor said to run it all the time. Contractor said to run it all the time when heating."

Non patent publication by TOM TALERICO. ECM Furnace Impact Assessment Report. January 2009. Pages: 78. Wisc. DOA Division of Energy. Madison, WI USA. https://focusonenergy.com/sites/default/files/emcfurnaceimpactassessment_evaluationreport.pdf. This study reports 18.6% to 34.7% of 150 participants and 9.7% to 17.1% of 82 non-participants operated the HVAC fan continuously or hourly. Page 1-3 states "Almost 70 percent of HVAC contractors always recommend continuous fan operation to ECM furnace purchasers who were previously operating their fan in auto mode and none never do. On the other hand, only 20 percent of HVAC contractors reported that they always recommend continuous fan operation to non-ECM furnace purchasers previously operating in auto mode and over half said that they never do."

Non Patent publication by SCOTT PIGG and TOM TALERICO. Electricity Savings from Variable-Speed Furnaces in Cold Climates. August 2004. Pages 16. American Council for an Energy Efficient Economy (ACEEE) Summer Study on Energy Efficiency in Buildings, Asilomar, CA, Published by ACEEE. Washington DC USA. https://www.aceee.org/files/proceedings/2004/data/papers/SS04_Panel1_Paper23.pdf. Page 9 reports 3,700 kWh/yr of fan energy use (non heat or cool) for the HVAC fan-on continuously with a standard fan motor and 740 kWh/yr with an efficient motor. Table 2, page 10 provides HVAC fan operation practices for 300 participants and 136 nonparticipants indicating 9 to 35% of participants and 11% to 14% of non-participants, operated the HVAC fan continuously or hourly.

Non Patent publication by AMERICAN SOCIETY OF HEATING, REFRIGERATING, AND AIR-CONDITIONING ENGINEERS (ASHRAE). Standard 62.1 (ANSI/ASHRAE 62.1-2022. Standard Ventilation for Acceptable Indoor Air Quality). 2022. Pages: 86. ASHRAE. Atlanta, GA USA https://www.ashrae.org/technical-resources/bookstore/standards-62-1-62-2

Non-patent publication by CARRIER CORPORATION INC., Totaline Gold Commercial Thermostat Installation and Operating Instructions. Date: November 1999. Pages: 12, United Technologies Corporation, One Carrier Place, Farmington, CT 06034-4015 USA https://dms.hvacpartners.com/docs/1005/Public/08/P274-2SI.pdf. Page 9 provides configuration instructions to "Allow Continuous Fan During Unoccupied Hours." When configuration is set to ON and fan is set to ON, the fan will run continuously during unoccupied periods. Default is fan ON during unoccupied periods.

Non-patent publication by ECOBEE INC., "How to control your HVAC system's fan with your ecobee thermostat" Date: Jan. 13, 2020, Page 7, Published by Ecobee Inc. 25 Dockside Dr Suite 700, Toronto, ON M5A 0B5, Canada https://support.ecobee.com/s/articles/How-to-control-your-HVAC-system-s-fan-with-your-ecobee-thermostat. Ecobee hourly HVAC fan-on control. "If the fan minimum run time is set for 15 minutes or lower, the fan will operate in two separate segments across the hour; if the fan minimum run time is set for 20 minutes or higher, the fan will run in four equal segments across the hour. If a heating or cooling cycle operates within any given hour, the length of either cycle will be deducted from the fan minimum run time."

Non-patent publication by GOOGLE INC. "How to Control Your Fan with a Nest Thermostat," Date: Dec. 30, 2019, Pages 1, Published by Google, Inc. 1600 Amphitheatre Parkway, Mountain View, Calif. 94043 USA. https://support.google.com/googlenest/answer/9296419?hl=en. Google describes a fan control for an hourly fan-on duration or a daily fan-on duration schedule.

Non-patent publication by HONEYWELL. "How Does the Fan Auto/On Switch or Key Work?" Date: Jan. 31, 2022. Pages 1, Honeywell Inc., Golden Valley, Minn. 55422 https://www.honeywellhome.com/us/en/support/7-day-programmable-thermostats-3/. Honeywell describes: "The Circ (Circulate) position, if available, will run the fan approximately 35% of the time, roughly 20 minutes each hour (2 ten-minute periods), minus any time the fan is already running with the heating or cooling system."

Non-patent publication M. VEGA-BARBAS ET AL., "AFOROS: A Low-Cost Wi-Fi-Based Monitoring System for Estimating Occupancy of Public Spaces," Date: June 2021, Pages 20, Multidisciplinary Digital Publishing Institute (MDPI). Basel, Switzerland. https://www.mdpi.com/1424-8220/21/11/3863. Discloses a method for passive monitoring using WiFi "probe request" messages transmitted by smartphones to determine WIFI access points using Media Access Control (MAC) addresses to detect occupancy based on stationary and mobile MAC addresses.

Bagno U.S. Pat. No. 2,655,645 (Bagno '645) filed in 1947 discloses an occupancy sensor method and apparatus for detecting motion in a confined space.

US Patent Application US 2015/0204571 A1 (Messmer '571) discloses mode one to minimize outdoor airflow into a building to minimize energy used to heat or cool outdoor air. Mode two minimizes the time to deliver fresh air while the system is not heating or cooling air to minimize discomfort for occupants.

Chapman et al. U.S. Pat. No. 7,469,550 ('550) is an energy saving control for appliances via an intelligent thermostat that provides programmatic control over the HVAC system and appliances via a communications network.

Parker U.S. Pat. No. 5,996,898 ('898) assigned to University of Central Florida, describes a control for turning a ceiling fan on and off based on a passive infrared sensor, combined with a temperature sensor to regulate the speed of the fan.

Lutron and Leviton occupancy sensors provide 277V, 120V, or 24 VDC output signals compatible with lighting systems, exhaust fans, and wall switches. Lutron and Leviton also make occupancy sensors with an isolated dry-contact relay output. See: leviton.com/en/products/osc20-rmw, lutron.com/TechnicalDocumentLibrary/369653.pdf Bisson U.S. Pat. No. 9,784,468B2 (Bisson '468) discloses a thermostat with a fan schedule providing automatic, ON, or circulation options. Col. 38, lines 55-56: to allow a user to view and/or verify their HVAC system schedule."

Geadelmann et al., US Patent Application Publication no. 2009/0032236 (Geadelmann '236) discloses a method for a user to enter a manually selected fan speed setting, and detects the manual fan speed and temporarily changes from the Auto fan speed to the manual fan speed for a predetermined time until a timer expires.

Johnson et al. US Patent Application No. 2006/0219382 (Johnson '382) discloses a control system for disabling a fan of a HVAC system upon the detection of an audible alarm from an independent source, such as a smoke alarm. The fan is disabled when the HVAC is off, operating in heating, cooling, or manual fan-on mode.

McQuade et al. US Patent Application Publication No. 2014/0195106 (McQuade '106) discloses a method for monitoring driver behaviors and manual overrides for cooling fan settings in fleet vehicles.

Estepp et al. US Patent Application Publication No. 2002/0090908 (Estepp '908) discloses an economizer demand ventilation module for an HVAC system that automatically shifts the damper in proportion to real-time conditions.

US Patent Application US 2008/0277486 (Seem '486) discloses a method for controlling an HVAC system based on occupancy.

European Patent EP2906880B1 (Du Li '880) discloses a coarse-grained sensor indicating an area is unoccupied based on WIFI signals from mobile devices, where the entire HVAC system and lights in the area can be turned off or adjusted to save energy.

Svitak et. al. US Patent Application Publication No. 20170299212) (Svitak '212) discloses controlling an activation and deactivation of an exhaust fan controlled by a humidistat where the exhaust fan is activated based on a measured humidity value exceeding a humidity activation criteria in a lookup table.

US Patent Application US 2018/0320916 A1 (Vincitore et al. '916) discloses a method for controlling an atmospheric condition of a space (e.g., temperature) with a plurality of air manipulation components based on mobile devices within the space.

Known prior art HVAC systems, sensors, and controls indicate an unresolved need to reduce ventilation fan energy use.

BRIEF SUMMARY OF THE INVENTION

The present invention addresses the above and other needs by providing one or more embodiments of an Occupancy-based Fan Control (OFC) method for a Heating, Ventilating, Air Conditioning (HVAC) fan to save energy. The OFC method detects the HVAC fan is controlled by at least one fan-on duration control selected by a user with a User Interface (UI). The at least one fan-on duration control operates the HVAC fan to recirculate air in a conditioned space for the at least one fan-on duration selected by the user. In one embodiment, the method provides at least one fan-on alarm message prior to overriding the at least one fan-on duration control. In another embodiment, the OFC method monitors an occupancy sensor signal from an occupancy sensor configured to determine an occupancy in a conditioned space served by an HVAC system and automatically overrides the at least one fan-on duration control to save energy when the conditioned space is unoccupied based on the occupancy sensor signal. The overriding comprises at least one method selected from the group consisting of: operating the HVAC fan based only on a thermostat call for cooling or a thermostat call for heating, operating the HVAC fan for less time than the at least one fan-on duration control selected by the user, and operating the HVAC fan for less frequency than the at least one fan-on duration control selected by the user. In another embodiment, the method changes the at least one fan-on duration control to an auto setting and only operates the HVAC fan based on the thermostat call for cooling or the thermostat call for heating.

An intermittent fan-on setting or an fan-on schedule operating for only 10 minutes per hour can increase annual fan electricity consumption by about 750 kWh/year for a typical small commercial or residential building. Continuous fan-on settings or fan-on schedules can increase annual fan electricity consumption by 3000 to 4500 kWh/year for a typical single family home. Continuous or intermittent fan-on settings or fan-on schedules will also waste cooling and heating energy use due to increasing the frequency of the thermostat call for a cooling or heating due to increased outdoor airflow from an air economizer and ducts (i.e., duct leakage) and increased outdoor airflow through the building shell from infiltration and exfiltration due to fan-induced indoor-outdoor pressure differences.

The potential energy savings from the OFC method are 2.7% of total residential energy use and 11.2% of total commercial building energy use. Residential buildings in the United States (US) consume about 11.63 Quadrillion Btu per year (Quads/year) and commercial buildings consume about 6.963 Quads/year based on data from the United States (US) Energy Information Administration (EIA). Therefore, potential US annual energy savings for the OFC method are about 1.093 Quads/year (1.093 Quads/year=0.314+ 0.779=2.7%*11.63+11.2%*6.963). According to US EIA, total US primary energy consumption in 2021 was about 97.3 Quads so the potential energy savings for the method are about 1.1% of total US energy use.

The present invention differs from known prior art patents and known occupancy sensors which perform different functions. Chapman '550 turns off appliances based on occupancy sensors. Messmer '571 minimizes outdoor air ventilation to minimize cooling and heating energy. Parker '898 turns off a ceiling fan. Svitak '212 controls activation and deactivation of an exhaust system for ventilating a bathroom using a humidity sensor. Known occupancy sensor dry contact relays can be used to turn off an exhaust fan or an HVAC system. However, turning off an HVAC system with an occupancy sensor dry contact relay will not allow the HVAC fan to operate during the thermostat call for cooling or heating when a building is unoccupied. This may cause health and safety issues when outdoor air temperatures are greater than 95 degrees Fahrenheit (F) or less than 32 F which may cause frozen water pipes.

Prior art patents do not disclose the OFC method. Bisson '468 discloses a thermostat with a fan schedule providing automatic, ON, or circulation options. Geadelmann '236 detects a manually selected fan speed and temporarily changes from the Auto fan speed to the manually selected fan speed until a timer expires. Johnson '382 turns off the HVAC fan based on an audible smoke alarm. McQuade '106 monitors manual overrides for cooling fans in fleet vehicles, and Estepp '908 controls a dam per for an economizer demand control ventilation module. Du Li '880 discloses turning off or adjusting HVAC or lighting systems based on occupancy. Vincitore '916 discloses controlling temperature and/or humidity of a space based on occupancy. Seem '486 discloses a method for controlling an HVAC system based on occupancy. Du Li '880, Vincitore '916, and Seem '486 do not disclose turning off or adjusting a fan-on duration control selected by a user based on occupancy sensor signals. Applying known occupancy sensor methods invented in 1947 by Bagno '645 have not resolved the unresolved fan-on energy use problem when buildings are unoccupied.

Known patents and occupancy sensors do not disclose detecting the HVAC fan is controlled by at least one fan-on duration control selected by a user and providing at least one fan-on alarm message prior to overriding the at least one fan-on duration control. Furthermore, known patents and occupancy sensors do not disclose overriding the at least one fan-on duration control selected by a user based on occupancy sensor signals, and operating the HVAC fan based only on a thermostat call for cooling or a thermostat call for heating, or operating the HVAC fan for less time and/or less frequency than the at least one fan-on duration control selected by the user. The OFC method is not obvious to persons having ordinary skill in the art due to not considering the HVAC fan-on duration control as a fault and the difficulty of implementing the present invention with known occupancy sensors and known HVAC fan controls.

A study published by the Wisconsin Division of Energy, reports 50 to 70% of residential HVAC contractors recommend operating the HVAC fan-on continuously, sporadically, or hourly. A study published by DNVGL for the California Public Utilities Commission reports 78% of commercial buildings in Southern California had HVAC fans running continuously in the as-found case and 97.2% had HVAC fans running continuously after treatment. By not recognizing the HVAC fan-on duration setting as a fault, approximately 1.1% of total annual US energy is inadvertently wasted due to HVAC fan-on duration control settings in both residential and commercial buildings.

The California Energy Commission (CEC) and the US Energy Information Administration (EIA) do not recognize ventilation fan-only energy as an end use. The California Energy Commission (CEC) combines fan-only energy with miscellaneous end uses. See DNVGL. May 2021. 2019 California Residential Appliance Saturation Study. CEC-200-2021-005-RSLTS. Table 11, p. 16. CEC. Sacramento, CA USA. https://www.energy.ca.gov/sites/default/files/2021-08/CEC-200-2021-005-RSLTS.pdf. The US Energy Information Administration (EIA) combines fan-on energy with other end uses. See USEIA. 2015 Residential Energy Consumption Survey: Energy Consumption and Expenditures Tables. Table CE3.1 Annual household site end-use consumption in the U.S. —totals and averages, 2015. USEIA, Washington, DC USA. https://www.eia.gov/consumption/residential/data/2015/c&e/pdf/ce3.1.pdf.

Due to fan-only energy not being recognized as an end use and the fan-on duration control not being recognized as a fault, persons of ordinary skill in the art do not recognize the unresolved problems that the OFC method resolves. Combining prior art elements, simple substitution, use of known techniques, applying a known device or method, obvious to try, known work, teachings, suggestions or motivations in the prior art have not led persons of ordinary skill in the art to modify or combine prior art teachings to arrive at the present invention OFC method.

Conventional thermostats provide a manual switch to set the HVAC fan-on duration control to an ALWAYS "on" continuous setting or an "AUTO" setting where the HVAC fan only operates during the thermostat call for cooling or heating. Smart thermostats provide similar fan-on settings for ALWAYS on and AUTO. Smart thermostats also provide user-selected fan-on settings of 0 to 55 minutes duration with a frequency of one or more periodic cycles within an hour or more where the fan-on duration control settings are divided into two or more durations or time periods per hour. Smart thermostat fan-on settings may also be set to operate every hour of every day (1 to 24 hours/day) or scheduled for specific hours in a weekly or monthly calendar for a user-selected duration and/or frequency. The non-patent publication by Ecobee Inc. describes an hourly HVAC fan-on duration control setting, and the non-patent publicaton by Google describes an hourly or a daily fan-on duration control schedule.

Known smart thermostats may adjust the intermittent or hourly fan-on duration control setting based on the call for cooling or heating, but known smart thermostats do not modify the duration or the frequency of the total fan-on duration. While known smart thermostats provide manual methods to change the hourly or daily fan-on control, they do not provide methods to detect the HVAC fan is controlled by the fan-on duration control selected by the user and automatically override the fan-on duration control to save energy when the conditioned space is unoccupied based on the occupancy sensor signal. Known smart thermostats do not provide at least one fan-on alarm message prior to overriding the fan-on duration control. Furthermore, known smart thermostats and Energy management Systems (EMS) do not provide methods to override the fan-on duration control when the conditioned space is unoccupied and change the fan-on duration control to operate the HVAC fan based only on a thermostat call for cooling or heating, or operate the HVAC fan for less time and/or less frequency than the fan-on duration control selected by the user.

The HVAC fan-on setting may comprise at least one fan-on duration control setting selected from the group consisting of: a continuous fan-on setting, a fixed-time duration (i.e., 5 minutes to multiple hours), a sporadic fan-on setting, an hourly fan-on setting, an intermittent or periodic fan-on setting, and a scheduled fan-on setting. The at least one fan-on duration control setting is preferably independent of a fan operation based on or associated with the thermostat call for cooling or heating.

The OFC method monitors the fan-on duration and automatically overrides the at least one fan-on duration control to save energy when the at least one fan-on duration is greater than or equal to a Threshold Fan-on Time (TFT). The duration or the frequency of the at least one fan-on duration control is modified but not disabled and may be resumed when the occupancy sensor indicates the conditioned space is occupied. The TFT may vary depending on monitored HVAC parameters with an occupancy sensor or a Carbon Dioxide ($CO_2$) sensor or other sensors to maintain a minimum outdoor airflow or air filtration to meet an indoor air quality requirement.

The OFC method may override the HVAC fan-on duration control setting based on an occupancy sensor signal. The OFC method may interface with at least one occupancy sensor technology selected from the group consisting of: a Passive InfraRed (PIR) or Ultrasonic sensor or a geofence using a Global Positioning System (GPS), a cellular network, a Wireless Fidelity (WIFI) network, a Radio Frequency Identification (RFID) network, a Location Based Sensor (LBS), or passive monitoring of WIFI devices.

Geofence technology is used by smart thermostats to adjust temperatures when residents are away, but not used to modify HVAC fan-on settings when a space served by an HVAC system is unoccupied. Passive monitoring of WiFi uses "probe request" messages periodically transmitted by smartphones to determine WIFI access points in the vicinity. The method uses Media Access Control (MAC) addresses to detect occupancy based on stationary and mobile MAC addresses. The occupancy estimate is based on analysis of MAC address randomization. The passive monitoring method uses WIFI sensors to analyze other fields present in the header of the IEEE 802.11 frames to extract unique information from each smartphone or WIFI device (printer, router, smart thermostat, HDTV, audio, appliance, vehicle, etc.). Passive monitoring of WIFi devices can provide occupancy estimates with 95% accuracy.

For commercial buildings a tolerance of 0 to +5 mobile MAC addresses may be sufficient to determine a minimum occupancy in a conditioned space served by the HVAC system to modify or change a fan-on setting to an auto setting to save energy. Modifying a continuous fan-on setting to an incremental fan-on setting may be performed in increments of 2 to 6 minutes per MAC address up to 30 minutes depending on airflow rates. The maximum airflow rate might be 20% less than the at least one fan-on duration control based on the upper limit of detected MAC addresses.

The OFC method may also comprise: overriding or superseding the fan-on setting, modifying the fan-on setting, and turning off the HVAC fan based on a user response to the at least one fan-on alarm message. The fan-on setting may comprise at least one fan-on setting selected from the group consisting of: a continuous fan-on setting, an intermittent fan-on setting, an hourly intermittent fan-on setting, a daily intermittent fan-on setting, and a scheduled fan-on setting. The TFT is preferably at least one time period or duration selected from the group consisting of: 60 minutes, adjustable from 60 minutes based on at least one indoor air quality measurement, and a sum of an intermittent fan-on duration of at least 60 minutes over 1 to 12 hours.

Overriding the fan-on setting and turning off the HVAC fan may comprise at least one action selected from the group consisting of: turning off the HVAC fan, turning off the HVAC fan for a variable or a fixed time period, turning off the HVAC fan for 0% to 100% of a scheduled fan-on time, skipping a scheduled fan-on setting by not turning on the HVAC fan, turning off the HVAC fan for a fraction of a scheduled fan-on time, turning off the HVAC fan for a fraction of time based on a thermostat call for cooling or a thermostat call for heating, and turning off the HVAC fan based on a geofencing or an occupancy sensor signal. The call for cooling or heating may be based on a thermostat first-stage signal or a thermostat second-stage signal.

BRIEF DESCRIPTION OF THE SEVERAL VIEWS OF THE DRAWINGS

The above and other aspects, features and advantages of the present invention will be more apparent from the following more particular description thereof, presented in conjunction with the following drawings.

Corresponding reference element numbers indicate corresponding components throughout several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined based on the claims.

Where the terms "about" or "generally" are associated with an element of the invention, it is intended to describe a feature's appearance to the human eye or human perception, and not a precise measurement, or within 10 percent of a stated value.

Figure 1:
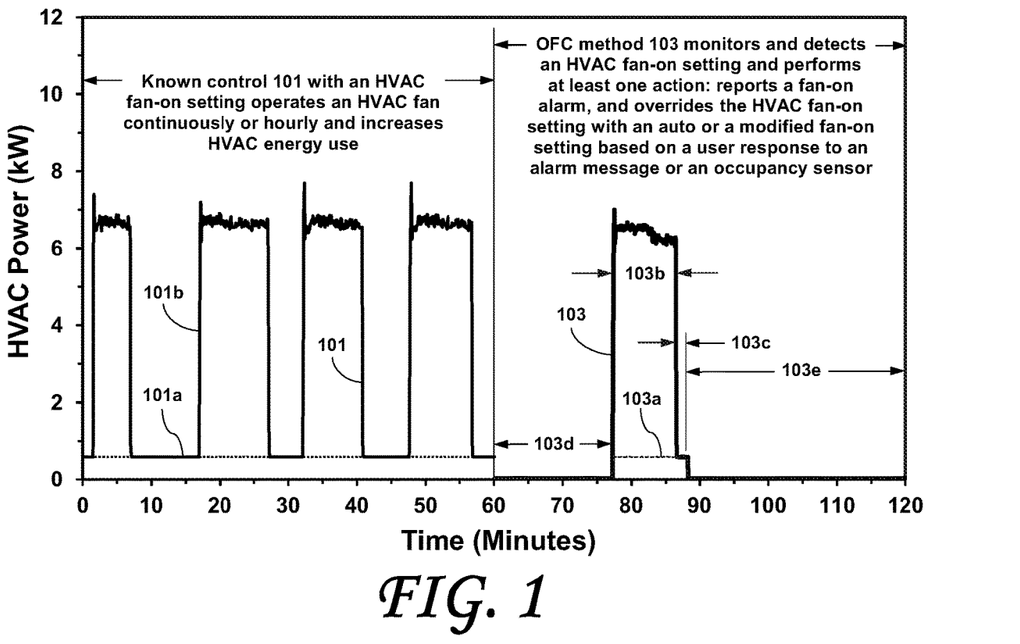
FIG. 1 provides measurements representing the total HVAC system power (kW) versus time of operation for a known control and the present invention Occupancy-based Fan Control (OFC) method modifying a fan-on setting or overriding to an auto setting and only operating the fan based on a thermostat call for cooling or heating.

FIG. 1 shows a known control 101 representing the total Heating, Ventilating, Air Conditioning (HVAC) system power (kW) versus time of operation with at least one fan-on duration control selected by a user operating an HVAC fan continuously, hourly, or intermittently. The known control 101 operates the known HVAC fan 101a for a time of 60 minutes which uses 0.6 kW of constant fan power and operates the known HVAC system 101b for about 30 minutes which uses about 6.5 kW during four thermostat calls for cooling. The thermostat cycles on the HVAC system more with continuous fan operation due to duct leakage or economizer outdoor airflow. FIG. 1 also shows an Occupancy-based Fan Control (OFC) method 103 representing an embodiment of the present invention. The OFC method 103 overrides the known control 101 and operates the HVAC fan based only on a thermostat call for cooling or heating to save 75% on HVAC energy compared to the known control 101. A known HVAC system controlled by a known occupancy sensor would not allow the HVAC system 103b or the HVAC fan 103a to operate based on a thermostat call for cooling when the space is unoccupied.

FIG. 1 shows the OFC method 103 saves HVAC energy by monitoring and detecting an least one fan-on duration control selected by a user and overriding the at least one fan-on duration control based on a response to a fan-on alarm message or overriding based on an occupancy sensor signal. The OFC fan-on alarm message provides options to reduce, modify, or change a duration or a frequency of the at least one fan-on duration control to save energy. The overriding may comprise operating the HVAC fan based only on a thermostat call for cooling or a thermostat call for heating, or operating the HVAC fan for less time and/or less frequency than the fan-on duration control selected by the user.

FIG. 1 shows the known control 101 operating the known HVAC fan 101a continuously from 0 to 60 minutes. Continuous HVAC fan operation causes the thermostat to operate the HVAC system 101b for four durations due to outdoor air drawn into the conditioned space from duct leakage or economizer outdoor airflow. FIG. 1 shows the OFC method 103 overriding the known control 101 with an auto setting and only operating the HVAC system 103b for a single 10-minute period and the HVAC fan 103a operating for 11.5 minutes which includes a 1.5-minute fan-off delay 103c, the HVAC fan operation based only on a thermostat call for cooling. FIG. 1 shows no HVAC fan operation during 103d for 17 minutes and during 103e for 31.5 minutes. When the conditioned space is occupied, the OFC method provides a fan-on alarm message with options for a user to reduce the duration or the frequency of a fan-on duration control to save energy. When the conditioned space is unoccupied, the overriding is based on an occupancy sensor signal from an occupancy sensor configured to determine an occupancy in a conditioned space served by the HVAC system. The occupancy sensor signal may comprise a geofence based on a WIFI Location Based Signal (LBS) or other occupancy sensor technology. The automatically overriding may also occur when the fan-on duration is greater than a Threshold Fan-on Time (TFT).

Figure 2:
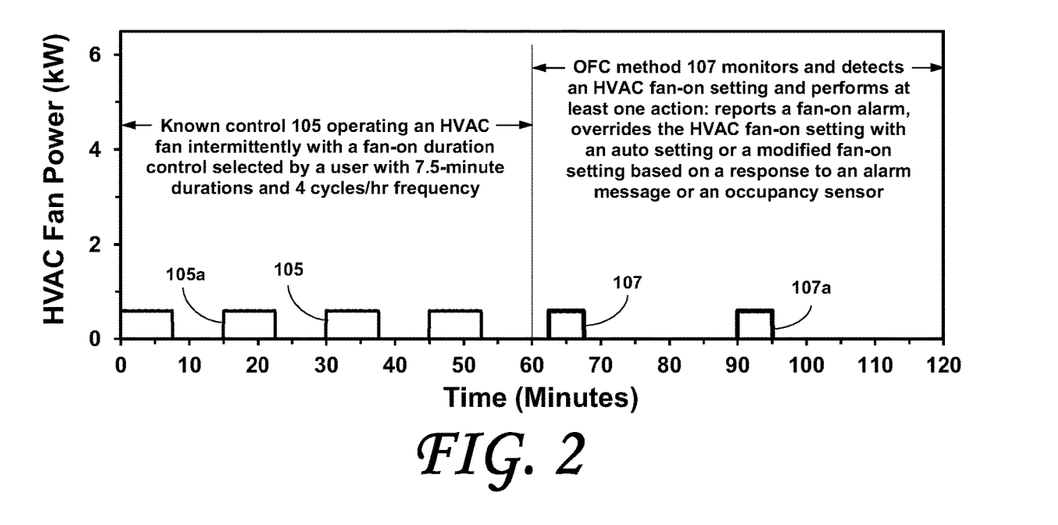
FIG. 2 provides measurements representing the HVAC fan power (kW) versus time of operation for a known control and the present invention OFC method reducing a duration and a frequency of the at least one fan-on duration control to save energy.

FIG. 2 provides measurements representing the HVAC fan power (kW) versus time of operation for a known control 105 and the OFC method 107 according to the present invention. The known control 105 operates the HVAC fan 105a intermittently from 0 to 60 minutes with a fan-on duration control selected by a user with four 7.5-minute durations and a frequency of 4 cycles per hour. The OFC method 107 only operates the HVAC fan 107a for two 5-minute durations and a frequency of 2 cycles per hour. The OFC method 107 monitors and detects the at least one fan-on duration control and reports a fan-on alarm message before automatically overriding the at least one fan-on duration control with a reduced fan-on duration and frequency. The overriding may be based on a user response to a fan-on alarm message or an occupancy sensor signal. FIG. 2 shows the OFC reduces HVAC fan-on energy use by 67% (0.67=1−(5×2)/(7.5×4)=1−10/30). The OFC method may comprise a software application providing the fan-on alarm message with an option for a user to select from 0 to 100% savings (e.g., auto setting) for the fan-on duration and/or frequency during periods when the conditioned space is occupied or unoccupied. The fan-on alarm message may ask if a user would like to change to an auto setting or reduce the duration and/or the frequency by 20 to 75% to save energy or provide a minimum ventilation, air filtration, or outdoor airflow (for an HVAC system with an economizer).

Figure 3:
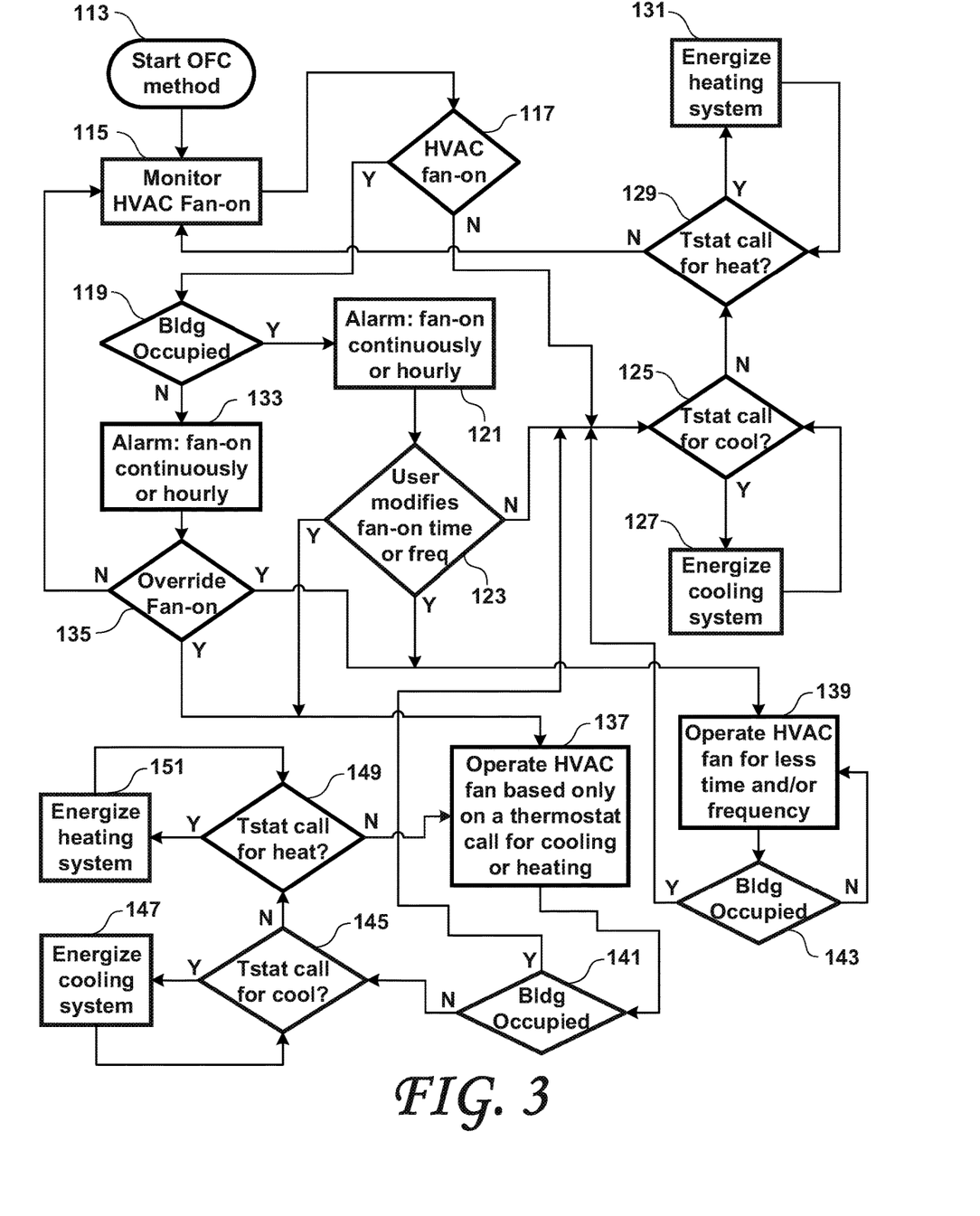
FIG. 3 shows the OFC method flow chart according to the present invention.

FIG. 3 shows a flow chart of the OFC method while the HVAC system is operating. The OFC method starts at step 113 and proceeds to step 115 to monitor the HVAC fan-on. The OFC method may also monitor the HVAC system comprising the HVAC fan-on time, a thermostat call for cooling or heating, and other HVAC system parameters. Other HVAC system parameters may comprise a minimum outdoor airflow, economizer damper position, indoor air quality, carbon dioxide concentration, conditioned space temperature, thermostat setpoints, HVAC system diagnostics, air filter status, static pressure, etc.). At step 117 the method detects an HVAC fan-on setting (with or without a thermostat call for cooling or heating). In one embodiment the HVAC fan-on is detected based on a fan G signal and no AC Y or heat W signals. In another OFC embodiment on a smart thermostat or an Energy Management System (EMS), the HVAC fan-on setting is detected in software settings. If step 117 is Yes (Y), an HVAC fan-on setting is detected, then the method goes to step 119. At step 119, the method detects whether the building is occupied based on an occupancy sensor signal from an occupancy sensor configured to determine an occupancy in a conditioned space served by the HVAC system. If step 119 is Yes (Y), the method goes to step 121.

At step 121, the method provides an alarm message to report the HVAC fan-on continuously or hourly (depending on the HVAC fan-on time monitored at step 115). At step 121, the alarm message provides at least one option to reduce, modify, or change a time (duration) or a frequency of the at least one fan-on time or duration control to save energy. After step 121, the method goes to step 123 to check if the user selects the at least one option to reduce, modify, or change the time or the frequency of the at least one fan-on duration control. If step 123 is No (No), the method proceeds to step 125 to check the thermostat call for cooling. If step 125 is Yes (Y), the method goes to step 127 to energize the cooling system until the thermostat call for cooling is satisfied at step 125. If step 125 is No (N), the method goes to step 129. At step 129, if the thermostat call for heating is Yes (Y), the method goes to step 131 to energize the heating system until the thermostat call for heating is satisfied at step 129. If step 129 is No (N), the method goes back to step 115 and continues to loop back until step 117 is Yes (Y). If step 117 is Yes (Y), the method goes to step 119.

If step 119 is No (N), the building is not occupied based on the occupancy sensor signal, then the method goes to step 133 and provides an alarm message to report the HVAC fan-on continuously or hourly (depending on HVAC fan-on time monitored at step 115). The step 133 alarm message may also provide at least one option to reduce, modify, or change the time or frequency of the at least one fan-on time or duration control to save energy. At step 135, the method determines whether to override the HVAC fan-on based on the occupancy sensor signal (or user response to change the time or frequency at step 133). Alternative step 135 may also check if the HVAC fan-on time (monitored in step 115) is greater than a Threshold Fan-on Time (TFT). The TFT may vary based on a user input or a default value of 30 seconds to 60 minutes. If the method does not override the HVAC fan-on setting at step 135, the method goes back to step 115 and continues monitoring the HVAC fan-on time. If step 135 overrides the HVAC fan-on setting based on the occupancy sensor signal at step 119, then the method goes to step 137 or step 139.

At step 137, the OFC method comprises automatically overriding the at least one HVAC fan-on duration control selected by a user when a space served by the HVAC system is unoccupied based on the occupancy sensor signal. The overriding may comprise an auto setting operating the HVAC fan based only on a thermostat call for cooling or a thermostat call for heating. After step 137, the method goes to step 141 and detects whether the building is occupied. If step 141 is Yes (Y), the building is occupied, then the method goes back to step 125 to check the thermostat call for cooling and continues (with building occupied). If step 141 is No (N), the building is unoccupied based on the occupancy sensor signal, then the method goes to step 145 to check for a thermostat call for cooling. At step 145, if the thermostat call for cooling is Yes (Y), the method goes to step 147 to energize the cooling system (with the HVAC fan) until the thermostat call for cooling is satisfied at step 145. If step 145 is No (N), the method goes to step 149. At step 149, if the thermostat call for heating is Yes (Y), the method goes to step 151 to energize the heating system (with the HVAC fan) until the thermostat call for heating is satisfied at step 149. If step 149 is No (N), the method goes back to step 137 and continues override the HVAC fan-on setting and continues to step 141 to check if the building is unoccupied. If step 141 is No (N) the building is not occupied, then the method continues. If step 141 determines the building is occupied, then the method goes back to step 125 to check the thermostat call for cooling and continues. If step 141 is Yes (Y), the at least one fan-on duration control is resumed when the occupancy sensor indicates the conditioned space is occupied.

At step 139, the method comprises automatically overriding the at least one fan-on duration and operating the HVAC fan for less time and/or less frequency than the at least one fan-on duration control selected by the user. This may comprise reducing a duration or a frequency of the at least one fan-on duration control setting to save energy and maintain a minimum outdoor airflow or air filtration to meet an indoor air quality requirement. The overriding may also include operating the HVAC fan based on the thermostat call for cooling or heating plus time for ventilation or air filtration, but less time than the at least one fan-on duration control selected by the user to save energy. After step 139, the method goes to step 143 and detects whether the building is occupied. If step 143 is No (N), the building is unoccupied based on the occupancy sensor signal, then the method goes back to step 139 and continues to operate the HVAC fan for less time or less frequency than the at least one fan-on duration control selected by the user. If step 143 is Yes (Y), and the building is occupied, then the method goes back to step 125 to check the thermostat call for cooling and continues. If step 143 is Yes (Y), the at least one fan-on duration control is resumed with the HVAC fan-on setting when the occupancy sensor indicates the conditioned space is occupied.

The Heating, Ventilating, Air Conditioning (HVAC) fan control method comprises detecting an HVAC fan is controlled by at least one fan-on duration control selected by a user with a user interface (UI) where the at least one fan-on duration control operates the HVAC fan to recirculate air in a conditioned space for the at least one fan-on duration. The method may comprise providing at least one fan-on alarm message prior to overriding the at least one fan-on duration control. The method may comprise monitoring an occupancy sensor signal from an occupancy sensor configured to determine an occupancy in a conditioned space served by an HVAC system and automatically overriding the at least one fan-on duration control to save energy when the conditioned space is unoccupied based on the occupancy sensor signal where the overriding comprises at least one method selected from the group consisting of: operating the HVAC fan based only on a thermostat call for cooling or a thermostat call for heating, operating the HVAC fan for less time than the at least one fan-on duration control selected by the user, and operating the HVAC fan for less frequency than the at least one fan-on duration control selected by the user.

The frequency may comprise a number of intermittent or periodic cycles of the at least one fan-on duration control selected by the user. For example, some smart thermostats provide a circulate feature where a user can select a fan-on duration control for a percentage of time, and the smart thermostat will operate the fan for a fraction of the fan-on duration and two to four intermittent or periodic cycles. For example, when a user selects circulate 35%, the smart thermostat may provide about 20 minutes of fan-on time per hour with two ten-minute periods, minus time the fan operates with the heating or cooling system. Another smart thermostat provides a fan-on duration control to operate the fan for two durations and two intermittent or periodic cycles per hour if the user selects a fan-on duration of less than 20 minutes. If the user selects a fan-on duration control of 20 minutes or greater, then the smart thermostat provides a fan-on duration control to operate the fan for four durations and four intermittent or periodic cycles per hour. The durations may not be equal and the intermittent cycles may not occur at equal intervals. Furthermore, if the heating or cooling cycle operates within any hour, the length of either cycle will be deducted from the Fan Min On Time. For example, if cooling runs for 5 minutes and Fan Min On Time is set to 20 minutes, 5 minutes will be deducted from the Fan Min On Time, but the total fan-on duration will not be reduced. The OFC method may reduce the duration and/or the frequency of the Fan Min On Time or the circulate fan-on duration or the hourly or scheduled fan-on duration to save energy based on an occupancy sensor signal.

Providing the at least one fan-on alarm message prior to overriding the at least one fan-on duration control comprises a message providing available options to reduce, modify, or change a duration or a frequency of the at least one fan-on duration control to save energy. The available options may comprise changing the at least one fan-on duration control to an auto setting to operate the HVAC fan based on a thermostat call for cooling or a thermostat call for heating to save energy. Providing the at least one fan-on alarm message comprises at least one communication method selected from the group consisting of: a message displayed on a smart thermostat or a software application, a text message, an email message, and an audio communication.

The User Interface (UI) comprises at least one UI selected from the group consisting of: a mechanical switch, a Graphical User Interface (GUI), a touch user interface, a Voice User Interface (VUI), a Command Line Interface (CLI), a menu-driven user interface, a form-based user interface, and a natural language user interface. The UI also comprises at least one control system selected from the group consisting of: a smart thermostat software application, a mobile device software application, a voice assistant software agent, a cloud-based software control program, a computer software program, and an Energy Management System (EMS).

The method overrides the at least one fan-on setting selected by the user to save energy while the space served by an HVAC system is unoccupied based on the occupancy sensor signal from an occupancy sensor configured to determine an occupancy in a conditioned space served by the HVAC system. The method may also modify the fan-on duration setting selected by the user to maintain a minimum outdoor airflow, a circulation for air filtration, or an indoor air quality. When the occupancy sensor indicates the conditioned space served by the HVAC system is occupied, the method may include operating the HVAC fan for a fan-off delay after the thermostat call for cooling or heating wherein the fan-off delay is based on a duration of the thermostat call for cooling or heating. The at least one fan-on duration control selected by the user is resumed when the occupancy sensor indicates the conditioned space is occupied.

Modifying or overriding the fan-on setting comprises at least one action selected from the group consisting of: turning off the HVAC fan, turning off the HVAC fan for a variable or a fixed time period, skipping a fan-on schedule and not turning on the HVAC fan, turning off the HVAC fan for a fraction of a fan-on setting duration or a fan-on schedule duration, modifying the fan-on setting based on an occupancy sensor signal.

Providing the at least one fan-on alarm message comprises at least one communication selected from the group consisting of: a message displayed on a smart thermostat or a software application, a text message, and an audio communication. The at least one fan-on alarm message may be selected from the group consisting of: the HVAC fan is on, select "Eco" mode to reduce fan-on operation by 20% or more (select %), the HVAC fan has been on for a monitored length of time, selecting a continuous fan-on setting will increase energy use or $CO_2$ emissions, select "auto" to set the fan to operate based only on a thermostat call for cooling or heating, select "modify" to reduce the duration or frequency of the fan-on duration to save energy, select "Eco" mode to reduce fan-on operation by 20% or more (select %).

The HVAC fan control method comprises detecting a HVAC fan is controlled by a fan-on setting, determining a space served by the HVAC system is unoccupied based on an occupancy sensor signal, and modifying the fan-on setting based on the occupancy sensor signal. The method further includes at least one action selected from the group consisting of: providing a fan-on alarm message, determining an HVAC fan-on duration is greater than a Threshold Fan-on Time (TFT), modifying the fan-on setting based on the TFT, and overriding the fan-on setting to an auto setting where the auto setting only operates the fan during a thermostat call for cooling or heating. The TFT may range from 0 to 60 minutes.

While the invention herein disclosed has been described by means of specific embodiments and applications thereof, numerous modifications and variations could be made thereto by those skilled in the art without departing from the scope of the invention set forth in the claims.

The invention claimed is:

1. A Heating, Ventilating, Air Conditioning (HVAC) fan control method, the method comprising:
   detecting an HVAC fan is controlled by at least one fan-on duration control selected by a user with a User Interface (UI);
   wherein the at least one fan-on duration control operates the HVAC fan to recirculate air in a conditioned space for the at least one fan-on duration selected by the user; and
   monitoring an occupancy sensor signal from an occupancy sensor configured to determine an occupancy in the conditioned space served by an HVAC system and automatically overriding the at least one fan-on duration control to save energy when the conditioned space is unoccupied based on the occupancy sensor signal and operating the HVAC fan based only on a thermostat call for cooling or a thermostat call for heating.

2. The method of claim 1, wherein the UI comprises at least one UI selected from the group consisting of: a mechanical switch, a graphical user interface (GUI), a touch user interface, a voice user interface (VUI), a command line interface (CLI), a menu-driven user interface, a form-based user interface, and a natural language user interface.

3. The method of claim 1, wherein the UI comprises at least one control system selected from the group consisting of: a smart thermostat software application, a mobile device software application, a voice assistant software agent, a cloud-based software control program, a computer software program, and an Energy Management System.

4. The method of claim 1, wherein the at least one fan-on duration control is resumed when the occupancy sensor indicates the conditioned space is occupied.

5. A Heating, Ventilating, Air Conditioning (HVAC) fan control method, the method comprising:
 detecting an HVAC fan is controlled by at least one fan-on duration control selected by a user with a User Interface (UI);
 wherein the at least one fan-on duration control operates the HVAC fan to recirculate air in a conditioned space for the at least one fan-on duration selected by the user; and
 providing at least one fan-on alarm message prior to overriding the at least one fan-on duration control.

6. The method of claim 5, wherein providing the at least one fan-on alarm message prior to overriding the at least one fan-on duration control comprises a message providing available options to modify or change a duration or a frequency of the at least one fan-on duration control to save energy.

7. The method of claim 5, wherein providing the at least one fan-on alarm message prior to overriding the at least one fan-on duration control comprises a message providing available options to change the at least one fan-on duration control to an auto setting and operating the HVAC fan based on a thermostat call for cooling or a thermostat call for heating to save energy.

8. The method of claim 5, wherein the UI comprises at least one UI selected from the group consisting of: a mechanical switch, a graphical user interface (GUI), a touch user interface, a voice user interface (VUI), a command line interface (CLI), a menu-driven user interface, a form-based user interface, and a natural language user interface.

9. The method of claim 5, wherein the UI comprises at least one control system selected from the group consisting of: a smart thermostat software application, a mobile device software application, a voice assistant software agent, a cloud-based software control program, a computer software program, and an Energy Management System.

10. The method of claim 5, wherein the providing the at least one fan-on alarm message comprises providing at least one communication method selected from the group consisting of: a message displayed on a smart thermostat or a software application, a text message, an email message, and an audio communication.

11. A Heating, Ventilating, Air Conditioning (HVAC) fan control method, the method comprising:
 detecting an HVAC fan is controlled by at least one fan-on duration control selected by a user with a User Interface (UI);
 wherein the at least one fan-on duration control operates the HVAC fan to recirculate air in a conditioned space for the at least one fan-on duration; and
 automatically overriding the at least one fan-on duration control to save energy, wherein the overriding comprises operating the HVAC fan for less time than the at least one fan-on duration control selected by the user.

12. The method of claim 11, wherein the UI comprises at least one UI selected from the group consisting of: a mechanical switch, a graphical user interface (GUI), a touch user interface, a voice user interface (VUI), a command line interface (CLI), a menu-driven user interface, a form-based user interface, and a natural language user interface.

13. The method of claim 11, wherein the UI comprises at least one control system selected from the group consisting of: a smart thermostat software application, a mobile device software application, a voice assistant software agent, a cloud-based software control program, a computer software program, and an Energy Management System.

14. The method of claim 11, wherein the at least one fan-on duration control is resumed when the occupancy sensor indicates the conditioned space is occupied.

* * * * *